United States Patent
Dasgupta (10) Patent No.: US 11,838,287 B2
(45) Date of Patent: Dec. 5, 2023

(54) ENABLING A MODE OF INTERACTION TO SUPPORT SPECIALLY-ABLED NEEDS OF AGENTS, VIA A WEB APP IN A CONTACT CENTER

(71) Applicant: inContact INC., Sandy, UT (US)

(72) Inventor: Aritra Animesh Dasgupta, Pune (IN)

(73) Assignee: INCONTACT INC., Sandy, UT (US)

( * ) Notice: Subject to any disclaimer, the term of this patent is extended or adjusted under 35 U.S.C. 154(b) by 242 days.

(21) Appl. No.: 17/153,900

(22) Filed: Jan. 21, 2021

(65) Prior Publication Data
US 2022/0231999 A1    Jul. 21, 2022

(51) Int. Cl.
  *H04L 29/06* (2006.01)
  *H04L 9/40* (2022.01)
  *G06F 9/54* (2006.01)

(52) U.S. Cl.
  CPC ............ *H04L 63/083* (2013.01); *G06F 9/547* (2013.01)

(58) Field of Classification Search
  CPC ............... H04L 63/083; H04L 63/0807; H04L 63/0892; H04L 63/101; H04L 63/102; G06F 9/547
  See application file for complete search history.

(56) References Cited

U.S. PATENT DOCUMENTS

| | | | |
|---|---|---|---|
| 6,088,451 A * | 7/2000 | He | H04L 63/0807 709/227 |
| 6,546,082 B1* | 4/2003 | Alcendor | G10L 13/00 704/E15.045 |
| 8,707,183 B2* | 4/2014 | Maehira | G06F 16/957 704/271 |
| 9,747,432 B1* | 8/2017 | Koller | H04W 12/37 |
| 2003/0164848 A1* | 9/2003 | Dutta | G10L 13/00 715/729 |
| 2004/0128389 A1* | 7/2004 | Kopchik | G06F 21/34 709/228 |
| 2004/0218451 A1* | 11/2004 | Said | G06F 3/0481 365/222 |

(Continued)

*Primary Examiner* — Khalid M Almaghayreh
(74) *Attorney, Agent, or Firm* — SOROKER AGMON NORDMAN RIBA; Liat Lin; Sharone Godesh (57) ABSTRACT

A computerized-method for enabling a mode of interaction to support specially-abled needs of agents, via a web-app, in a contact-center. The computerized-method is operating an Application Programming Interface (API) client. The API-client includes receiving credentials from a user, upon login of the user to the web-app and then communicating with an authentication-server for an authentication-service and forwarding the credentials thereto. After successful completion, forwarding the credentials to an authorization-service that is retrieving a preassigned disability role-ID, according to the credentials and transmitting a preassigned disability role-ID in an access-token. The API-client receives the access-token, having the preassigned disability role-ID and sends the access-token to the authorization-service, to receive a permissions-list, according to the preassigned disability role-ID of the user and then stores the permissions-list of the user on a database associated with the API-Client and loads a component to support specially-abled needs, according to the stored permissions-list.

12 Claims, 5 Drawing Sheets

(56) References Cited

U.S. PATENT DOCUMENTS

| | | | | |
|---|---|---|---|---|
| 2005/0015255 A1* | 1/2005 | Kaye | .................... | G09B 21/001 |
| | | | | 704/271 |
| 2005/0283532 A1* | 12/2005 | Kim | .................... | H04L 12/2829 |
| | | | | 709/225 |
| 2006/0256950 A1* | 11/2006 | Patel | .................... | H04M 3/493 |
| | | | | 379/265.02 |
| 2008/0070495 A1* | 3/2008 | Stricklen | ................ | H04W 8/20 |
| | | | | 455/3.01 |
| 2008/0148059 A1* | 6/2008 | Shapiro | ............ | G06Q 20/40145 |
| | | | | 713/186 |
| 2010/0145729 A1* | 6/2010 | Katz | ................ | G06Q 10/06315 |
| | | | | 434/362 |
| 2011/0009099 A1* | 1/2011 | Durecu | ................ | H04Q 3/0045 |
| | | | | 455/414.1 |
| 2012/0072858 A1* | 3/2012 | Thoppae | ............... | H04L 63/105 |
| | | | | 726/5 |
| 2012/0329518 A1* | 12/2012 | Garg | ....................... | G10L 13/00 |
| | | | | 455/556.1 |
| 2014/0325353 A1* | 10/2014 | Chudge | ................. | G06F 3/0482 |
| | | | | 715/716 |
| 2015/0330787 A1* | 11/2015 | Cioffi | .................... | G01C 21/20 |
| | | | | 701/538 |
| 2017/0329906 A1* | 11/2017 | Anis | ................ | G16Z 99/00 |
| 2018/0095588 A1* | 4/2018 | Klein | ....................... | H04L 9/3231 |
| 2020/0184156 A1* | 6/2020 | Badr | ....................... | G06F 40/35 |
| 2021/0203785 A1* | 7/2021 | Walburger | ........... | H04M 3/5175 |
| 2022/0103679 A1* | 3/2022 | Zare | ................. | H04M 1/72475 |

\* cited by examiner

| Disabilities | Smart Features | Custom Smart Features |
|---|---|---|
| Autism<br>Dyslexia<br>Cognitive Disorder<br>Intellectual/Behavioral Disability<br>Developmental Delay<br>ADHD/Epilepsy | User-input:voice-type<br>User-output:voice-visual | User-output:voice-highlight:visual<br>Zooms the page by 25% highlights titles(Saturation) and links |
| Orthopedic Impairment | User-input:voice<br>User-output:voice-visual | User-input: voice-keyboard-navigator automatically activates the Keyboard Navigation profile |
| Speech Language Impairment | User-input:type-voice<br>User-output:voice-visual | |
| Hearing Impairments/Deafness | User-input:type-voice<br>User-output:visual | |
| Deaf Blindness<br>Blind users | User-input:voice<br>User-output:voice | User-input: voice-keyboard-navigator automatically activates Keyboard Navigation profile<br>User-output: screen reader-voice prompts to screen reader users, making a page compatible with screen readers, such as TalkBack, Job Access w Screen (JAWS), VoiceOver |

Figure 5

ENABLING A MODE OF INTERACTION TO SUPPORT SPECIALLY-ABLED NEEDS OF AGENTS, VIA A WEB APP IN A CONTACT CENTER

TECHNICAL FIELD

The present disclosure relates to the field of contact center systems and more specifically, to the field of enabling users having various disabilities to automatically switch to their preferred mode of interaction via application right from login.

BACKGROUND

Information Technologies (IT) Accessibility Laws and Policies (Section 508) provide details about Hypertext Markup Language (HTML) web accessibility. However, it's a very generic guideline and it doesn't guarantee that an assistive technology will be needed or be helpful for a specific disability. While best practice guidelines or checklists for a written code exist for many years to let specially-abled users, such as hearing impaired, people with cognitive difficulties and vision impairment, gain access to online content. In practice, one functionality which aids a particular disability might act as a hindrance to a second person having another disability, which means that there is a need for a technical solution that will enable customization of the required support needed.

Moreover, the guidelines provide how to make content compatible to work with assistive devices. E.g., screen readers, alternative keyboards, or joysticks, but give little details on which cases and how to embed these details into one application or component which can support a variety of specially-abled needs. Therefore, there is a need for a technical solution for enabling a mode of interaction to support specially-abled needs of agents, via a web app for the reasons detailed below.

One reason is that even though there is no straightforward set of legal requirements for website accessibility, the Americans with Disabilities Act (ADA) compliance makes it a legal matter and a business may be presented with a lawsuit when the business does not accommodate people with special needs. Currently, about 19.5 percent of people with a disability are employed in contact centers, as per statistics available for 2019, and there is no customized solution to support each disability which is covered under the ADA.

Another reason is that disabilities that aren't visible can come with a new set of challenges and there is a tremendous amount of diversity m the disabled community that is often overlooked. For example, two people with the same disability can have radically different ways of addressing it, but employers sometimes tail to work with each person on an individual basis.

Yet another reason is that sometimes workplace accommodations to disabilities, e.g., special equipment, even relatively minor ones, may attract unwanted attention from colleagues. Also, sometimes when agents are disclosing a disability coworkers may show a disrespectful reaction.

Lastly, specially-abled agents want to be independent. Accordingly, to accommodate their need for independence and to create better working environments, employers and businesses must identify and manage disabilities because specially-abled people is a large unemployed talent tool.

Yet another reason is that showing the ropes to new hires may have a high cost and on top of that there are costs of the equipment often needed to accommodate specially-abled agents.

Yet another reason is that companies which were caught short by the pandemic are hiring from a pool that was already prepared to handle a surge in phone traffic away from offices. Moreover, call centers have had to adapt swiftly because the pandemic has dealt them a double blow. They are fielding more calls from customers inquiring about online orders or seeking refunds or forbearance. However, many of the people who would normally answer those calls either can't get to work or are not equipped to work from home.

Yet another reason is that right now is the time that companies can comply to the ADA guidelines. They already had the equipment and internet connections that call centers require. The problem with hiring managers is that there aren't enough employees to maintain necessary staffing levels, and they are looking at people with disabilities to occupy those job, given the fact that people with disabilities have an overall higher job retention rate.

For all the reasons mentioned above, there is a need for a computerized-method and a computerized-system for enabling a mode of interaction to support specially-abled needs of agents, via a web app, in a contact center.

SUMMARY

There is thus provided, in accordance with some embodiments of the present disclosure, a computerized method for enabling a mode of interaction to support specially-abled needs of agents, via a web app, in a contact center.

Furthermore, in accordance with some embodiments of the present disclosure, in a computerized system comprising a processor, a database and a database associated to the API client; and a memory to store the plurality of databases, operating an Application Programming interface (API) client by the processor. The API client may be communicating with a web app of a contact center, over a communication channel.

Furthermore, in accordance with some embodiments of the present disclosure, the API client may be configured to: receive credentials from a user, upon login of the user to the web app of the contact center, and communicate with an authentication server over a communication channel for an authentication service, and forward the credentials thereto.

Furthermore, in accordance with some embodiments of the present disclosure, after the authentication service is completed successfully, the API client may be forwarding the credentials to an authorization service.

Furthermore, in accordance with some embodiments of the present disclosure, the authorization service may be configured to retrieve a preassigned disability role-ID from a database, for the user, according to the credentials and to transmit a preassigned disability role-ID in an access token.

Furthermore, in accordance with some embodiments of the present disclosure, the API client may further receive the access token, having the preassigned disability role-ID and may send the access token to an authorization service,to receive a permissions list, according to the preassigned disability role-ID of the user.

Furthermore, in accordance with some embodiments of the present disclosure, the API client may further store the permissions list of the user on a database associated with the API client; and may load a component to support specially-abled needs, according to the stored permissions list.

Furthermore, in accordance with some embodiments of the present disclosure, the preassigned disability role-ID is retrieved front a preconfigured user profile of the user.

Furthermore, in accordance with some embodiments of the present disclosure, the loaded component includes enabling actions in the web app via the API client, by a voice command or text command instead of click command.

Furthermore, in accordance with some embodiments of the present disclosure, the enabled actions by the voice command are at least one of: navigating for a clickable item, and commands to operate a process in the web app.

Furthermore, in accordance with some embodiments of the present disclosure, the voice command may be configured to include a recitation of (i) the clickable item; and (ii) a preconfigured acronym or a short-form-of the clickable item.

Furthermore, in accordance with some embodiments of the present disclosure, upon request of a user, a list of permissions and associated disabilities is presented on a display unit for assessment if a disability of a candidate user is included in the list of permissions and associated disabilities.

Furthermore, in accordance with some embodiments of the present disclosure, the loaded component is replacing additional hardware or equipment that is connected to the API client.

Furthermore, in accordance with some embodiments of the present disclosure, the API client may be integrated with one or more third-party assistive software or hardware, and each of the one or more third-party assistive software or hardware may be associated with a role-ID and operated according to the stored permissions list.

Furthermore, in accordance with some embodiments of the present disclosure, the permissions list may include one or more user-input options and one or more user-output options which are preconfigured to be associated with one or more disabilities.

Furthermore, in accordance with some embodiments of the present disclosure, the user-input options may include at least one of: (i) a voice command (ii) a type command (iii) a voice-keyboard-navigator; and wherein the user-output options include at least one of: (i) a vocal screen reader; (ii) highlighted screen; and (iii) zoom page by a preconfigured percentage.

There is further provided, in accordance with some embodiments of the present disclosure, a computerized-system for enabling a mode of interaction to support specially-abled needs of agents, via a web app, in a contact center.

Furthermore, in accordance with some embodiments of the present disclosure, the computerized-system may include: an Application Programming interface (API) client. The API client may be communicating with a web app of a contact center over a communication channel, an authentication server, an authorization server, a database; a database associated with the API client; and a memory to store the plurality of databases.

Furthermore, in accordance with some embodiments of the present disclosure, upon login of a user to a contact center system, receiving credentials from the user via the API client may be communicating with the authentication server for an authentication service, over a communication channel, according to the received credentials.

Furthermore, in accordance with some embodiments of the present disclosure, after the authentication service is completed successfully, the API client may be forwarding the credentials to an authorization service.

Furthermore, in accordance with some embodiments of the present disclosure, the authorization service may be configured to: (i) retrieve a preassigned disability role-ID from a database, for the user; and (ii) transmit the preassigned disability role-ID in an access token to the API client.

Furthermore, in accordance with some embodiments of the present disclosure, the API client may be sending the access token to an authorization service.

Furthermore, in accordance with some embodiments of the present disclosure, the authorization service may be configured to transmit a permissions list to the API client, according to the transmitted disability role-ID of the user.

Furthermore, in accordance with some embodiments of the present disclosure, the API client is configured to store the permissions list of the user on the database associated with the API client and to load a component to support specially-abled needs, according to the stored permissions list.

BRIEF DESCRIPTION OF THE DRAWINGS

For the present disclosure to be better understood and for its practical applications to be appreciated, the following Figures are provided and referenced hereafter. It should be noted that the Figures are given as examples only and in no way limit the scope of the disclosure. Like components are denoted by like reference numerals.

DETAILED DESCRIPTION

In the following detailed description, numerous specific details are set forth in order to provide a thorough understanding of the disclosure. However, it will be understood by those of ordinary skill in the art, that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The terms 'processor' or 'computer' or derivatives thereof denote an apparatus that is capable of carrying out a provided or an incorporated program and/or is capable to controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The term "command" as used herein refers to a command to an application fin navigating in a menu thereof operate a process in the web app or other operations. The command may be a voice or a text input that is received front a user such as an agent which may be translated to updating or fetching of any data from a database that is associated with an application. For example, fetching user details of "Thomas", or assigning a user "Thomas" to team "Delta", or updating firs name of Thomas to "Tom", or fetching skill details of "Thomas".

The term "click command" as used herein refers to a click on a mouse button at specified coordinates on a screen to operate a command of an application.

The term "clickable item" as used herein refers to a content: or an operation in an application that can be reached by a mouse click.

The term "text command" as used herein refers to a command that is typed.

The term "web app" as used herein refers to a software that runs on a or a portal server i.e., web server.

The term "bearer token" as used herein, refers to tokens that allow requests to authenticate using an access key, such as a JavaScript Object Notation (JSON) Web Token (JWT). The token is a text string, included in a request header.

The term "access token" as used herein, refers to tokens which are used to allow an application, such as a web app to access an Application Programming Interface (API) client. The application receives an access token after receiving credentials from the user and successfully authenticates and authorizes access, and then passes the access token including the user's credentials when it calls the target API client. The passed access token informs the API client that the bearer of the access token has been authorized to access the web app via the API client and to perform specific actions specified by the scope that was granted during authorization. The access token may be based on RFC 7519 e.g., JSON Web Token and RFC 7515 e.g., JSON Web Signature. The access token represents an authenticated user or service and includes authorization information as well as a reference to an identity of the user. Access tokens are time boxed with an expiration time and until expired they are assumed to represent the state of the user and the user's authorization.

The term "modes of interaction" as used herein, refers to an interaction of a user with an application such as a web application via an API client. The interaction ma include navigating of the user in the application menus or updating a user profile and the like. The modes of interaction means navigation or doing some action on the web application where the mode of taking input could be by voice, by typing or could be any third party disability support software (keyboards based navigation, like Job Access with Speech (JAWS) and the like).

Contact centers employ agents in different age groups. Each agent is associated with a level of proficiency. Over time, the disabled and elderly agents may develop eyesight problems with the challenging nature of the contact center tasks. It has been observed that even if training and handouts have been provided on how to perform a set of instructions given a scenario, disabled agents may have issues in recollecting or following the steps.

Accordingly, there is a need for a technical solution that will enable users with various disabilities to automatically switch to their preferred mode of interaction with content of web applications of the contact center, right from login. Thus, the disabled agents may no longer depend on colleagues to help or support them with their daily tasks and activities. Furthermore, with the needed technical solution, the agents may decide to directly perform complex tasks or workflows or navigate through the web applications with ease of command-based input, such as voice or text and supported output for their needs.

Furthermore, there is a need in a technical solution that will reduce the agents' support time and training costs. Thus, since the web apps which are used by contact centers systems, are commonly command-based, the needed technical solution should help to increase their productivity and reduce mistakes.

The embodiments taught herein enable a mode of interaction to support specially-able needs of agents, via a web app, in a contact center, by solving the technical problem of having a customized solution to support a large variety of disabilities.

Figure 1:
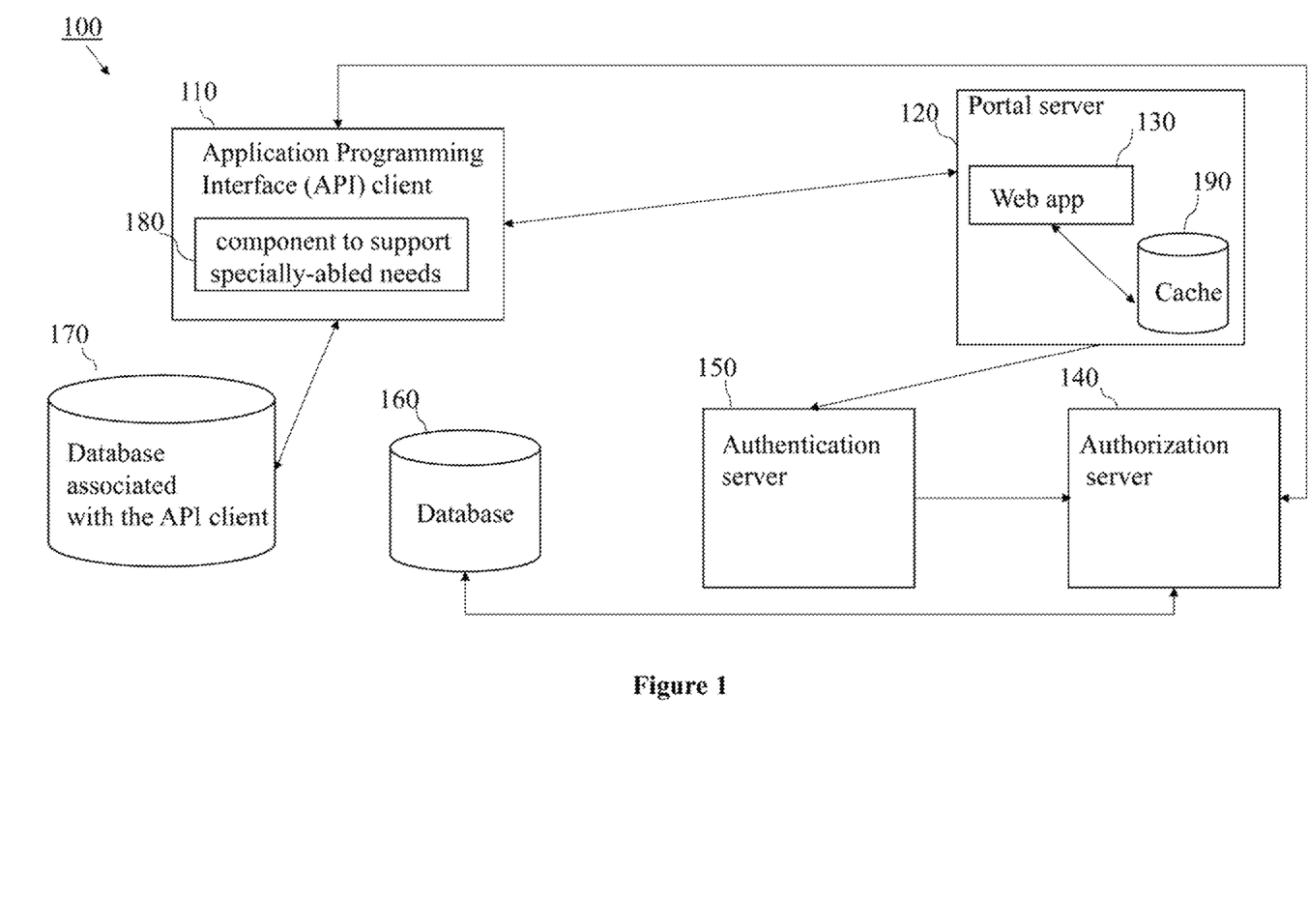
FIG. 1 is a diagram of a system for enabling a mode of interaction to support specially-abled needs of agents, via a web app, in a contact center, in accordance with some embodiments of the present disclosure.

FIG. 1 is a diagram of a system 100 for enabling a mode of interaction to support specially abled needs of agents, via a web app, in a contact center, in accordance with some embodiments of the present disclosure.

According to some embodiments of the present disclosure, before implementing system 100, a contact center may search for existing frequently used commands, that require nun inputs by users on each page of one or more web applications. Then, the contact center may generate and publish a list of these frequently used commands for later on disability support. The handler or the hook in server-less components may be updated accordingly to automate or support the business logic.

According to some embodiments of the present disclosure, users may access a web app, such as web app 130, that is running on a portal server, such as portal server 120 via an Application Programing Interface (API) client, such as API client 110. The web app 130 may be a web app for agents in a contact center. When users are logging to the web app 130, via the API client 110, they may provide their credentials, e.g., username and password. Accordingly, the API client 110 may forward the credentials to an authentication service, that is running on an authentication server, such as authentication server 150. When the authentication process may be completed successfully, by the authentication service, the API client 110 may forward the credentials to an authorization service that is running on an authorization server, such as authorization server 140.

According to some embodiments of the present disclosure, the authorization server 140 may return to the API client 110, an access token having information relevant to handling and management of the user's activity. The authorization server 140 may retrieve a preassigned disability role-ID from a database, such as database 160 for the user, according to the user's credentials and may transmit a preassigned disability role-ID in an access token. The disability role-ID may be preconfigured in the profile of the user, e.g., agent's profile.

According to some embodiments of the present disclosure, users such as agents in a contact center having disabilities may share the type of their disability or their underlying medical condition to a user, such as a supervisor or a manager and accordingly the user may configure, e.g., create or update the agent's profile. The configuration of the user's profile may include assigning a disability role-ID that would be indicated to the API client 110 of the agent, after the agent logs into the web app 130 via the API client 110.

According to some embodiments of the present disclosure, based on the indication of the disability role-ID, the API client 110 may load a component to support specially-abled needs, according to the stored permissions list that was preassigned to the disability role-ID of the user.

According to some embodiments of the present disclosure, a matrix of all disabilities which were recognized by the government against their optimal mode of input and output may be maintained on a database, such as a database 160 or a cache 190 that is associated with the web app 130 or a database associated with the API client 170.

According to some embodiments of the present disclosure, the data stored in database 160 and in database associated with the API client 170 may be stored in the same database. The permissions list and disability role-ID that is assigned to a user may be stored in database 160. The acronym or short form of a command which may be used by a user for navigating in the web app 130, via the API client 110, may be stored in the database associated with the API client 170.

According to some embodiments of the present disclosure, the matrix of all disabilities may be a mapping to disability role and the permission list associated with each disability role may be created. The API client 170 may generate the tables and entries for the mapping in the database. A custom disability role may be created by the admin user from the available permission list via the web API client id.

According to some embodiments of the present disclosure, for each agent, if the agent has any disability, then a disability role-ID, which specifies the disability of the agent, may be configured in the agent's profile. Otherwise, when there is no need to support specially-abled needs of an agent, then the disability role-ID may be zeroed or nulled.

Figure 5:
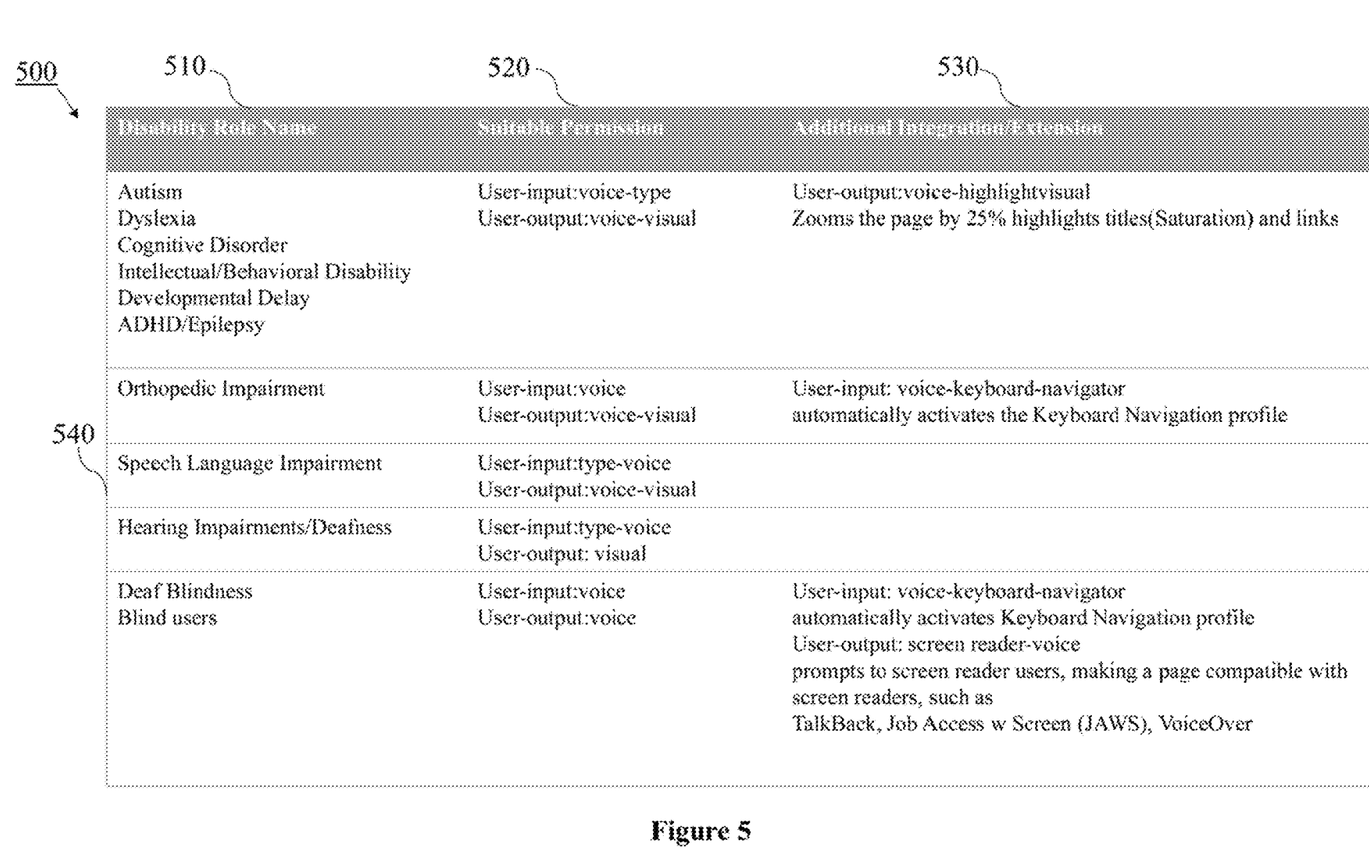
FIG. 5 shows an example of a mapping of disabilities to modes of interaction, in accordance with some embodiments of the present disclosure.

According to some embodiments of the present disclosure, the disability role-ID may be associated to a permissions list, such as example table 500 in FIG. 5, of a mapping of disabilities and modes for interaction with any web app such as web app 130. The mapping may be used to load a component, such as the component to support specially-abled needs 180, according to the stored permissions list, to support each interaction of the user with any web app, such as web app 130, via an API client, such as API client 110.

According to some embodiments of the present disclosure, the permissions which are included in the permissions list, may be for the input and the output during each interaction with the web app 130. A permission for the input, such as for navigating in menus of the web app 130, may be voice. For example, reciting a command of the web app 130, or spelling an acronym or a short form of the command.

Since, issues of spelling out fields or an clickable content are common with people having speech language impairments, agents may just spell out an acronym or the short form of the element according, to previously given handouts.

According to some embodiments of the present disclosure, heavily used actions taken by agents may be identified based on the most used API client calls to decide which command should also have an acronym or a short form.

According to some embodiments of the present disclosure, a permission for output may be for example, voice or visual. For example, when the permission for output is set as voice, the content of the text that is displayed on the screen, by the web app may be recited to the agent, via a microphone connected to the agent's computerized device.

According to some embodiments of the present disclosure, in addition to navigating in menus of the web app 130, a user may be enabled to perform actions, such as update user, assign team or create a team by the component to support specially-abled needs 180 and that component may execute and perform the action. Thus, the users may avoid a series of mouse clicks.

According to some embodiments of the present disclosure, after every action performed by the user on the web app 130 via the API client 110, an additional voice notification, based on disability, may be relayed back to the user.

According to some embodiments of the present disclosure, when the permission for output has been set to be visual, it may be having the content, that is displayed by the web app 130 magnified. For example, the loaded component, such as the component to support specially-abled needs 180, may zoom the page of the web app 130 by 25% and may highlight links and titles e.g., by saturation.

According to some embodiments of the present disclosure, another permission for input may be typing. The typing may be enabled by the loaded component, in addition to voice.

According to some embodiments of the present disclosure, a voice command to the web app 130 may be supported by a component of the API client, such as a component to support specially-abled needs 180.

Figure 2:
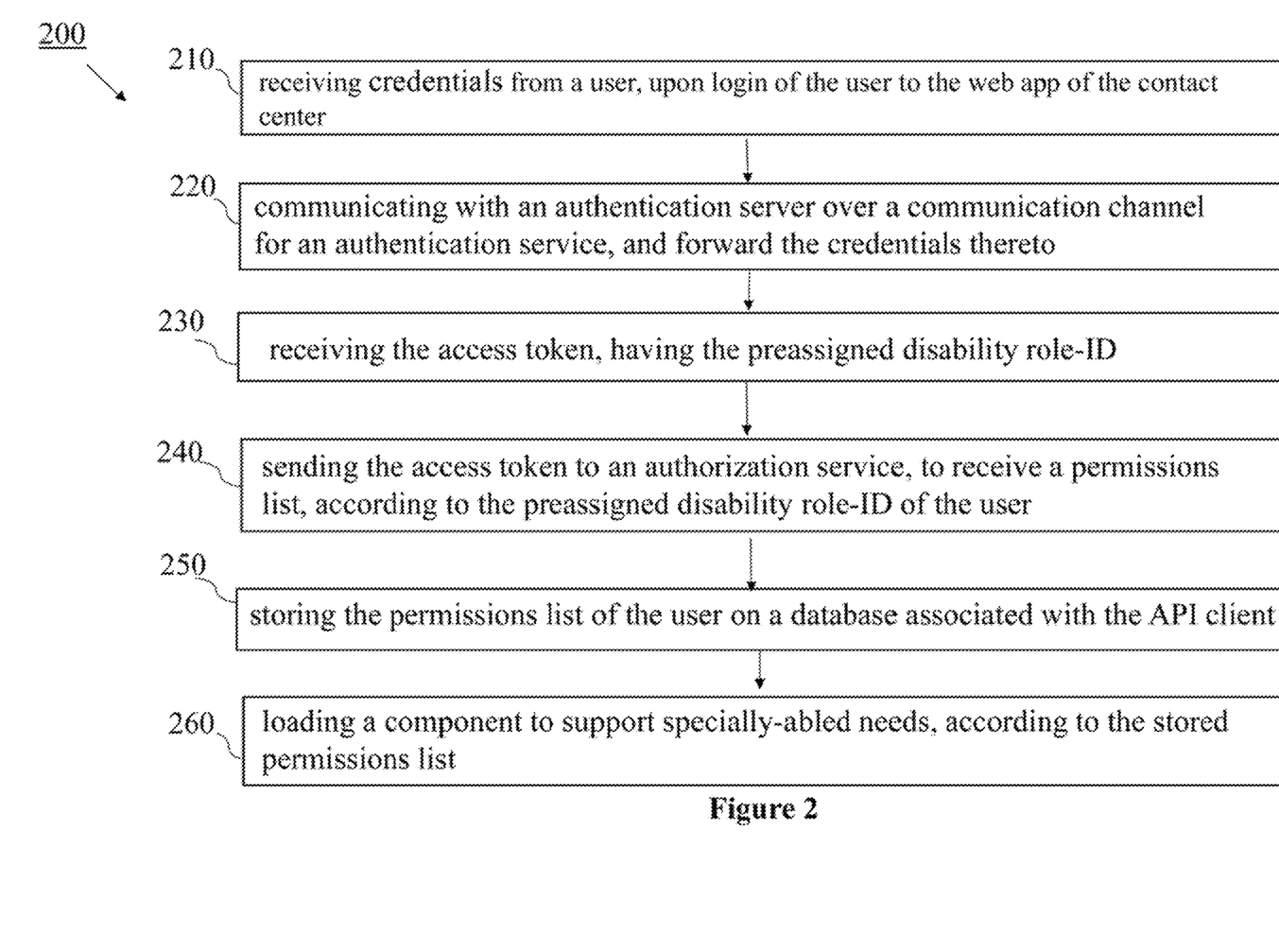
FIG. 2 is a high-level workflow of an Application Programming. Interface (API) client for enabling a mode of interaction to support specially-abled needs of agents, via a web app, in accordance with some embodiments of the present disclosure.

According to some embodiments of the present disclosure, a computerized method and a computerized system may operate an API client 110, such as API client 200 in FIG. 2. The API client 110 may be configured to load a component to the API client, such as a component to support specially-abled needs 180, for enabling a mode of interaction that is supporting specially-abled needs of agents when they are operating a web app such as web app 130.

According to some embodiments of the present disclosure, the loaded, component, such as the component to support specially-abled needs 180 in FIG. 1, may be a third-party component e.g., software or hardware, that may be integrated with the API client 110.

According to some embodiments of the present disclosure, the third-party component may be one or more third-party assistive software or hardware may operate according to the stored permissions list that is associated to the disability role-ID.

According to some embodiments of the present disclosure, an API client, such as API client 110 may be configure to receive credentials from a user, upon login of the user to a web app, such as web app 130 of the contact center, and to communicate with an authentication server, such as authentication server 150 over a communication channel for an authentication service. The API client may forward the credentials the authentication server 150.

According to some embodiments of the present disclosure, after the authentication service may be completed successfully, the API client 110 may be forwarding the credentials to an authorization service. The authorization service may be running on an authorization server such as authorization server 140 and may be configured to retrieve a preassigned disability role-ID from a database, such as database 160 for the user, according to the credentials and may transmit a preassigned disability role-ID in an access token.

According to some embodiments of the present disclosure, the API client 110 may receive the access token, having the preassigned disability role-ID and may send the access token to the authorization service, to receive a permissions list, according to the preassigned disability role-ID of the user and then may store the permissions list of the user on a database such as a database associated with the API client 170. As soon as the permissions for the disability role-ID are fetched for a user the user logs in, they are kept in the database associated with the API client 170. According to some embodiments of the present disclosure, the database associated with the API client 170 may be managed by a code that is executing in the web browser used by the API client 110. This management of the database includes the ability to operate across version updates where the "schema" of the stored information doesn't match that of the executing code, and similar to cookies operation, this information can be cleared.

According to some embodiments of the present disclosure, based on the permission list that may be stored on a database, such as the database that is associated with the API client 110, it may decide which components to load on each page of the web app, such as web app 130. The local storage functionality may be supported by all web browsers which enables to store large data without an expiry date. The local storage of the browser is used to store the user's permission list based on the disability role-ID the user has, which is referenced by the web app to decide which components to load on each page of the web app 130 to support the specially-abled needs of the user.

According to some embodiments of the present disclosure, the API client 110 may load a component to support specially-abled needs, according to the stored permissions list.

According to some embodiments of the present disclosure, a computerized method and a computerized system that is operating an API client such as API client 200 in FIG. 2 may assist hiring managers to decide right on the spot if they have necessary infrastructure in place to hire people with a certain disability simply by looking at an existing matrix or mapping of disability to modes of interaction, which are supported by the loaded component to the API client, such as a component to support specially-abled needs 180.

According to some embodiments of the present disclosure, computerized method and a computerized system that is operating an API client such as API client 200 in FIG. 2 might make additional equipment or hardware redundant for various of the categories of disabled agents, as well as reduce legal risk for the hiring company.

According to some embodiments of the present disclosure, assistive technologies like Job Access with Speech (JAWS) screen readers, hot key, screen reader, braille, chatbot modules and the like, may be integrated with the API client 110 as per disability, i.e., each one of the one or more third-party assistive software or hardware may be associated with a role-ID and may be operated according to the stored permissions list.

FIG. 2 is a high-level workflow of an Application Programming Interface (API) client 200 for enabling a mode of interaction to support specially-abled needs of agents, via a web app, in accordance with some embodiments of the present disclosure. The web app may be an application such as web app 130 in FIG. 1.

According to some embodiments of the present disclosure, operation 210 comprising receiving credentials from a user, upon login of the user to the web app of the contact center.

According to some embodiments of the present disclosure, operation 220 comprising communicating with an authentication server over a communication channel for an authentication service and forward the credentials thereto. The authentication server may be an authentication server, such as authentication server 150 in FIG. 1.

According to some embodiments of the present disclosure, operation 230 comprising receiving the access token, having the preassigned disability role-ID. When an agent has no disabilities the disability roll-ID may be zeroed or nulled.

According to some embodiments of the present disclosure, operation 240 comprising sending the access token to an authorization service, to receive a permissions list, according to the preassigned disability role-ID of the user. The authorization service may be running on an authorization server such as authorization server 140 in FIG. 1.

According to some embodiments of the present disclosure, operation 250 comprising storing the permissions list of the user on a database associated with the API client. The database associated with the API client may be database associated with the API client 170 in FIG. 1. The API client may be API client 110 in FIG. 1.

According to some embodiments of the present disclosure, operation 260 comprising, loading a component to support specially-abled needs, according to the stored permissions list. The component may be a component to support specially-abled needs, such as component to support specially-abled needs 180 in FIG. 1.

Figure 3:
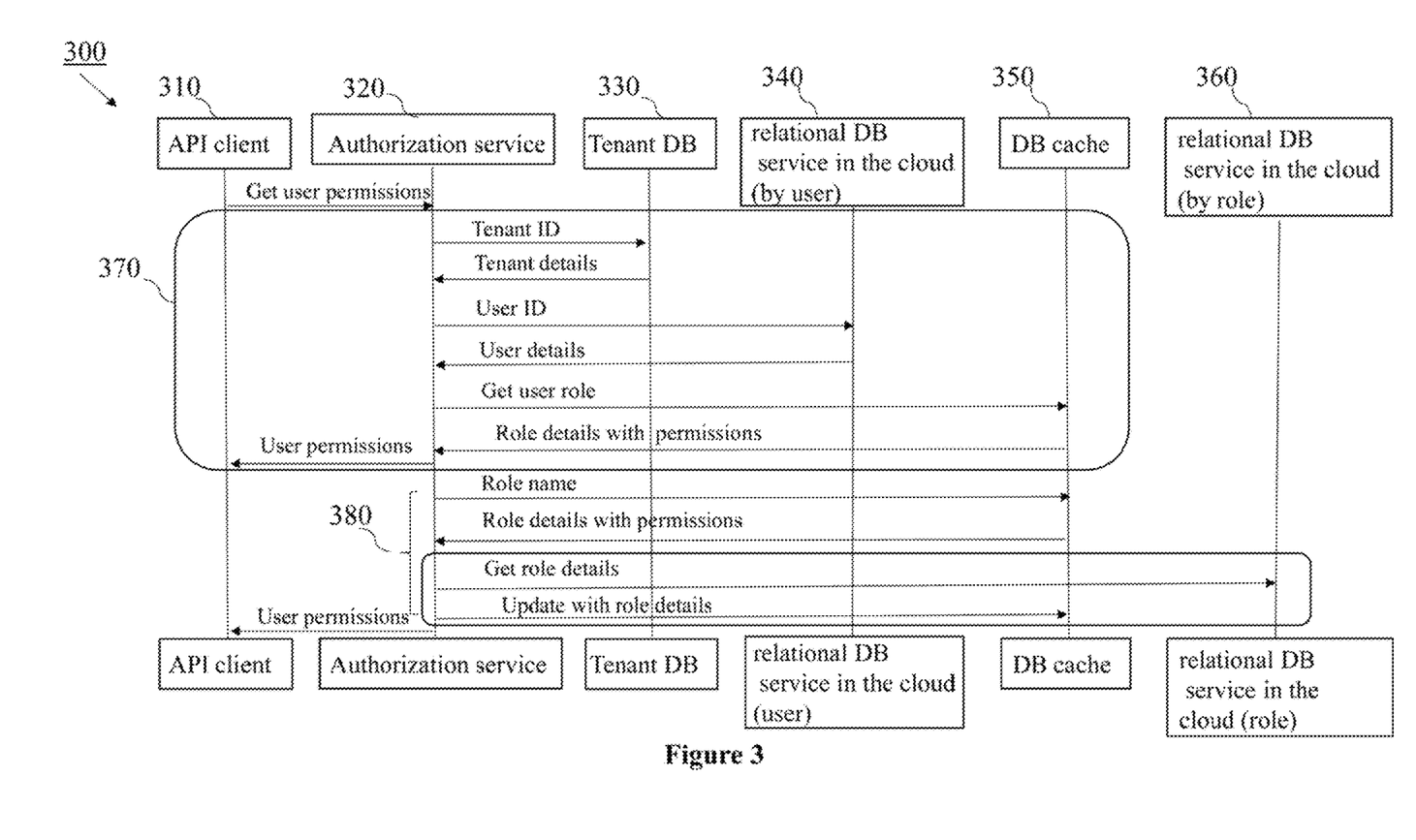
FIG. 3 is a high-level workflow of an Application Programming Interface (API) client in a cloud-based environment, in accordance with some embodiments of the present disclosure.

FIG. 3 is a high-level workflow of an Application Programming Interface (API) client 300 in a cloud-based environment, in accordance with some embodiments of the present disclosure.

According to some embodiments of the present disclosure, an API client 310, such as API client 200 in FIG. 2, and API client 110 in FIG. 1, may be operated in a cloud-based environment.

According to some embodiments of the present disclosure, based on a list of permissions that may be cached for each user, the API client 110 may determine the most suitable mode of interaction with the web app.

According to some embodiments of the present disclosure, in some cases an administrator user of a web app, such as web app 130 in FIG. 1, may create a custom disability role-ID from the list of all permission available for an agent and may assign a disability role-ID to an agent.

According to some embodiments of the present disclosure, when the user is for example, specially-abled and can't type, the API client 310 may load a component, such as a component to support specially-abled needs 180 in FIG. 1 which may enable voice command to navigate in the menus of the web app. In another example, when the user is blind, the API client 310 may load a component, such as a component to support specially-abled needs 180 in FIG. 1, which may not make an accessibility specific User interface (UI) changes like color coding, as it won't matter and may provide notification of each action as voice input. In yet another example, a deaf user may use voice-based commands, but the loaded component may not enable output as voice or video because it may not be included in the list of permissions of the user.

According to some embodiments of the present disclosure, the voice command may be enabled by a third-party service, such as Amazon Polly™ which turns text into speech, and thus, enables a web app, such as web app 130 in FIG. 1, to become a speech-enabled application.

According to some embodiments of the present disclosure, an API client, such as API client 310 may request user permissions from an authorization service, such as authorization service 320, that is running on an authorization server, such as authorization server 140 in FIG. 1.

According to some embodiments of the present disclosure, in a cloud-based computing environment, such as Amazon Web Service™, the authorization service 320 may transmit to a tenant database, such as tenant DB 330, a tenant ID. The tenant DB 330 may be a multi-tenant storage such as Amazon DynamoDB™.

According to some embodiments of the present disclosure, the operations in element 370 ma be operated by an administrator user of the API client 310. The operations in element 370 may include fetching a permission list to the API client 310 for the administrator user.

According to some embodiments of the present disclosure, the operations in element 380 may be operated by the API client 310 for a user, such as a specially-abled user, to fetch the associated permission list. The operations in element 380 may include: fetching the list of permissions of the user from the DB cache 350 by the user's disability role name if it is in the DB cache 350 to the API client 310. If the permission list is not present in DB cache 350, querying the relational DB service in the cloud (by role) 360 by role id or by role name and then updating the DB cache 350 with the permission list that has been fetched and returning the API 310 the permission list for the related web app.

According to some embodiments of the present disclosure, the tenant DB 330 may send back to the authorization service 320 the tenant details, according to the tenant ID. Then, the authorization service 320 may transmit a user ID to a relational database service in the cloud, such as relational DB service in the cloud (by user) 340. The relational DB service in the cloud (by user) 340 may provide data by user information and may be for example, Amazon Relational Database Service (RDS)™.

According to some embodiments of the present disclosure, the relational DB service in the cloud (by user) 340 may send back user details. The user details may include a disability role-ID and a user role, such as disability role name 510 in FIG. 5. When an agent has no disabilities the disability role-ID may be zeroed or nulled in the user's profile.

According to some embodiments of the present disclosure, the authorization service 320, such as authorization service that is running on authorization server 140 in FIG. 1, may send the user role to a database cache, such as DB cache 350. The DB cache 350 may be Redis cache which is in-memory data structure store, used as a database, cache, and message broker. Accordingly, the DB cache 350 may send back role details with permissions, to the authorization service 320.

According to some embodiments of the present disclosure, the authorization service 320 may send the user permissions to the API client 310. Then, the authorization service 320 may send role name to the DB cache 350 and the DB cache 350 may send back the role details with permissions, such as suitable permission 520 in FIG. 5.

According to some embodiments of the present disclosure, when the role details which were sent back by the DB cache 350 are empty, meaning that they are not in the DB cache 350. The DB cache 350 may be expired after a certain time period. If the disability role-ID details are not present in the DB cache 350, then the details may be fetched from the database and the cache may be updated with those details. The DB cache 350 may be used in between as its cheaper to fetch from cache then from the database.

then the authorization service 320 may get role details from a relational DB service in the cloud by role, such as relational DB service in the cloud (by role) 360 and then may update DB cache 350 with the role details and send the API client 310 user permissions. The relational DB service in the cloud (by role) 360 may provide data according to role-ID or role-name.

Figure 4:
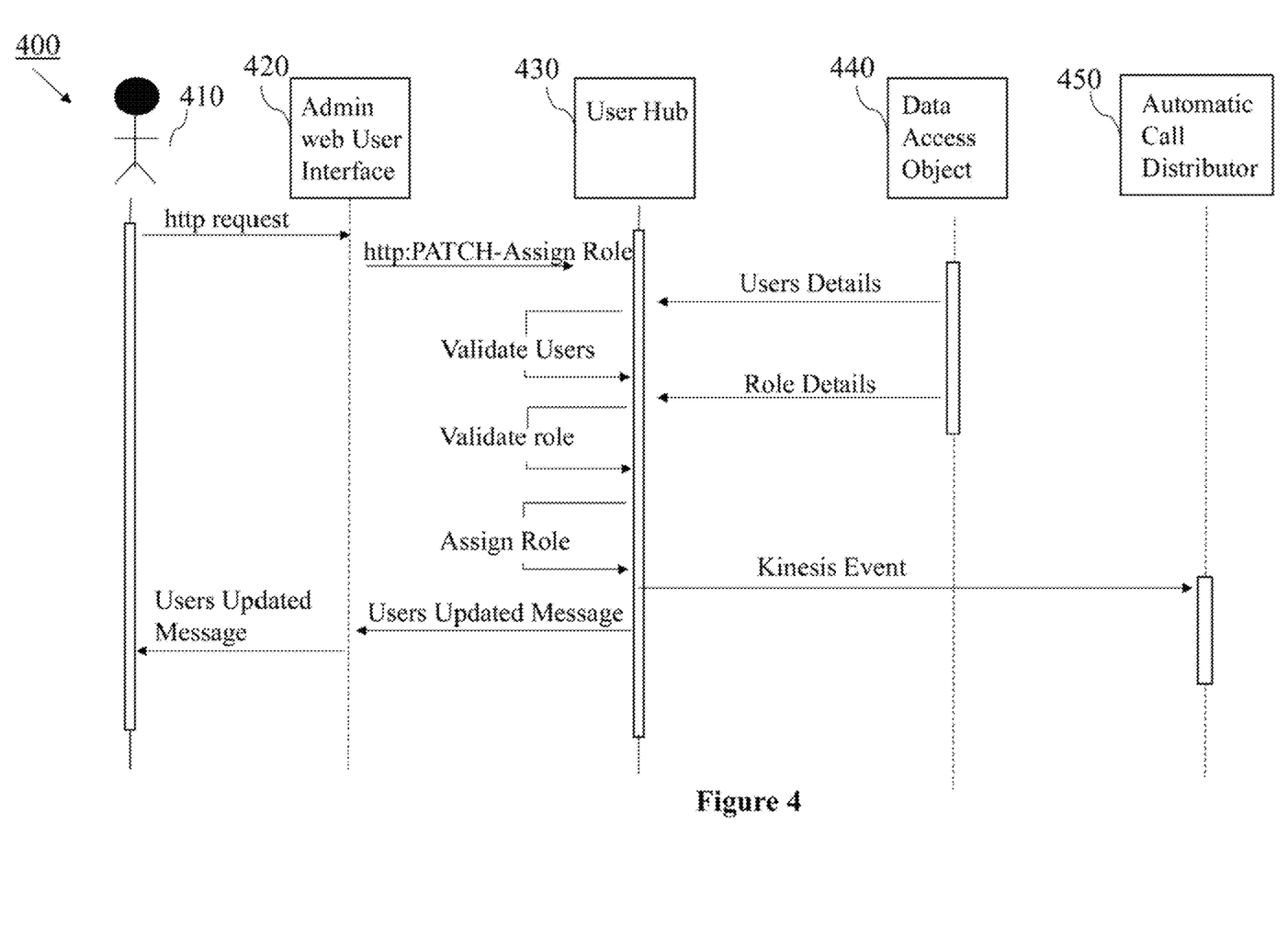
FIG. 4 illustrates a workflow of a computerized method for enabling a mode of interaction to support specially-abled needs of agents, via a web app, in a contact center, in accordance with some embodiments of the present disclosure

FIG. 4 illustrates a workflow of a computerized method 400 for enabling a mode of interaction to support specially-abled needs of agents, via a web app, in a contact center, in accordance with some embodiments of the present disclosure.

According to some embodiments of the present disclosure, a user 410, such as an agent in a contact center may initiate a Hypertext Transfer Protocol (HTTP) request via an API client, such as API client 110 in FIG. 1, to an admin web user interface 420 of a web application, such as web app 130 in FIG. 1.

According to some embodiments of the present disclosure, a user such as an admin or a supervisor may add an applicable disability Role to a user profile. Upon user login an authentication service may return an access token having a role-ID.

According to some embodiments of the present disclosure, the admin web user interface 420 may send an http: PATCH-Assign role The PATCH-Assign role may be activated when a disabled agent is onboarded and the supervisor, or the administrator user confirms the category or type of use the agent is suffering from. Then the admin may fetch the list of disability roles that are currently supported and may assign the best suited role to the agent from the admin web user interface that is when to assign role to use during call is being made to a user hub 430.

According to some embodiments of the present disclosure, user details and role details may be forwarded to user hub 430 from data access object 440. A kinesis event from user hub 430 may be sent to an automatic call distributor 450.

FIG. 5 shows an example table 500 of a mapping of disabilities to modes of interaction, in accordance with some embodiments of the present disclosure.

According to some embodiments of the present disclosure, a matrix of all disabilities against their optimal mode of input and output may be maintained. For example, table 500 of a mapping of disabilities to modes of interaction.

According to some embodiments of the present disclosure, disabilities such as autism, dyslexia, cognitive disorder, intellectual or behavioral disability, development delay, Attention Deficit Hyperactivity Disorder (ADHD) or epilepsy may be configured under the same disability role-ID category or disability role-name 510. The disability role name 510 may be mapped to a mode of interaction, such as a list of permissions, e.g., suitable permission 520. To the suitable permission 520 may be associated an additional integration or extension 530.

According to some embodiments of the present disclosure, for example, disability role-name 510, such as speech language impairment 540 may be mapped to suitable permission 520 of user input type or voice and user output voice or visual.

According to some embodiments of the present disclosure, when the suitable permission 520 may be set to be type and voice for the permissions for user input are, the loaded component, such as a component to support specially-abled needs 180 in FIG. 1, may enable the user to type the command instead of mouse clicking the command or to recite the command to the web app such as web app 130 in FIG. 1. Reciting of a command may include spelling an acronym or a short form of the command.

According to some embodiments of the present disclosure, when a command is forwarded as text, e.g., the user types the command, the API client, such as API client 110 may make a Representational state transfer (REST) call to a command executor component of the web app, such as web app 130, which calls a handler or a hook with page-context, token and a success or failure message notification is sent back.

According to some embodiments of the present disclosure, when a command is recited, e.g., voice command, the API client, such as API client 110 in FIG. 1, may forward the command as voice with page-context and token. The API client 110 may call the loaded component, such as the component to support specially-abled needs 180 in FIG. 1, which may validate the request e.g., recited command and may request additional input in response.

According to some embodiments of the present disclosure, when a voice command or text command may be operated there may be a brokerage component between the database associated with the API client 170 and the loaded component to support specially-abled needs 180 which may be a serverless component, such as serverless AWS Lambda™ component or it may be any other server. A serverless component, such as, Amazon Web Services (AWS) Lambda™, which is an event-driven, serverless computing platform provided by Amazon™, as part of Amazon Web Services™ may be used to execute voice or text command that is forwarded to it.

According to some embodiments of the present disclosure, the API client 110 may parse a command and send the command along with page-context, token and co-relation id e.g., request id to the loaded component. The component may validate whether the command is supported or valid on the basis of the forwarded page-context. If the command can be executed or not, may be a decision that is taken from the access token. For every command to execute it might need one or multiple inputs.

For example, for a command such as "delete user "Thomas"" the input may be "Thomase". But if any of the inputs are not forwarded or incorrectly forwarded, then the API client may need another input from user. So to track or handle multiple requests for same command correlation id is used. If the command is not valid or the input that is forwarded for the command is not valid, a failure notification may be sent back to the user.

the command as voice and the API client, such as API client 110 in FIG. 1 may make a REST call to a command executor component of the web app, such as web app 130, which calls a handler or a hook with page-context, token and Co-relation-ID and a success or failure message notification is sent back.

According to some embodiments of the present disclosure, when the suitable permission 520 are set to be voice or visual for the permissions for user output, the loaded component, such as a component to support specially-abled needs 180 in FIG. 1, may be a component that enables the output, e.g., the content of the text displayed on the screen by the web app, such as web app 130 in FIG. 1, to be recited to the user, e.g., agent via a microphone connected to the agent's computerized device. Alternatively, the loaded component, such as a component to support specially-abled needs 180 in FIG. 1, may be a component that enables the output, e.g., the content of the text to be displayed by the web app magnified. For example, the loaded component may zoom the web app page by 25% and may highlight links and titles e.g., by saturation.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for enabling a mode of interaction to support specially-abled needs of agents, via a web app that is running on a portal server, in a cloud-based contact center, the computerized-method comprising:

in a computerized system in a cloud-based environment, said computerized system comprising a processor, a database and a database including: a database associated to an Application Programming Interface (API) client in the cloud-based contact center; and a memory to store the plurality of databases, operating the API client by said processor, said API client is communicating with the web app of the cloud-based contact center, over a first communication channel, said API client is configured to:
receive credentials from a computerized device of a user, upon login of the user via the computerized device of the user to the web app that is running on the portal server of the cloud-based contact center;
communicate with an authentication server over a second communication channel for an authentication service, and forward the credentials thereto;
wherein after the authentication service is completed successfully, forwarding the credentials to an authorization service;
wherein said authorization service is configured to retrieve a preassigned disability role-ID from a database, for the user, according to the credentials and to transmit a preassigned disability role-ID in an access token;
receive the access token, having the preassigned disability role-ID;
send the access token to the authorization service, to receive a permissions list, according to the preassigned disability role-ID of the user;
store the permissions list of the user on a database associated with the API client, wherein the API client in the cloud-based contact center is integrated with one or more third-party assistive software or hardware, and wherein each of the one or more third-party assistive software or hardware is associated with a role-ID and operated according to the stored permissions list; and
using a preconfigured mapping of disabilities and permissions to load a component to support specially-abled needs of the user when the computerized device of the user is interacting with the web app that is running on the portal server, according to the stored permissions list.

2. The computerized-method of claim 1, the preassigned disability role-ID is retrieved from a preconfigured user profile of the user.

3. The computerized-method of claim 1, wherein the loaded component includes enabling actions in the web app via the API client, by a voice command or text command instead of click command.

4. The computerized-method of claim 3, wherein the enabled actions by the voice command are at least one of: navigating for a clickable item, and commands to operate a process in the web app.

5. The computerized-method of claim 3, wherein the voice command is configured to include a recitation of: (i) the clickable item; and (ii) a preconfigured acronym or a short-form-of the clickable item.

6. The computerized-method of claim 5, wherein the voice command is operated by retrieving from the database associated to the API client a mapping of the recited clickable-item or the preconfigured acronym or the short-form-of the clickable item to a method-name and processing the method-name.

7. The computerized-method of claim 1, wherein upon request of a user, via the computerized device of the user, the permissions list of the user and associated disabilities is presented on a display unit for assessment if a disability of a candidate user is included in the list of permissions and associated disabilities.

8. The computerized-method of claim 1, wherein the loaded component is replacing additional hardware or equipment that is connected to the API client in the cloud-based contact center.

9. The computerized-method of claim 1, wherein the permissions list includes one or more user-input options and one or more user-output options which are preconfigured to be associated with one or more disabilities.

10. The computerized-method of claim 9, wherein the user-input options include at least one of: (i) a voice command; (ii) a type command; (iii) a voice-keyboard-navigator; and wherein the user-output options include at least one of (i) a vocal screen reader; (ii) highlighted screen; and (iii) zoom page by a preconfigured percentage.

11. The computerized-method of claim 1, wherein the permissions in the preconfigured mapping of disabilities and permissions include modes for interaction with the web app, wherein the modes for interaction of user-input options include at least one of: (i) voice command; (ii) type command; and (iii) voice-keyboard-navigator, and wherein user-output options include at least one of: (i) vocal screen reader; (ii) highlighted screen; and (iii) zoom page by a preconfigured percentage.

12. A computerized-system in a cloud-based environment for enabling a mode of interaction to support specially-abled needs of agents, via a web app that is running on a portal server, in a cloud-based contact center, the computerized-system comprising:
an Application Programming interface (API) client, said API client is communicating with a web app of the cloud-based contact center over a first communication channel;
an authentication server;
an authorization server;
a database;
a plurality of databases including: a database;
a database associated to the API client;
a memory to store the plurality of databases;
upon login of a user via a computerized device of the user to a cloud-based contact center system, receiving credentials from the computerized device of the user via the API client;
communicating with the authentication server for an authentication service, over a second communication channel, according to the received credentials;
wherein after the authentication service is completed successfully, forwarding the credentials to an authorization service, in the authorization server;
said authorization service is configured to:
(i) retrieve a preassigned disability role-ID from a database, for the user; and (ii) transmit the preassigned disability role-ID in an access token to the API client;
said API client sends the access token to an authorization service;
wherein said authorization service is configured to transmit a permissions list to the API client, according to the transmitted disability role-ID of the user; and
wherein the API client is configured to store the permissions list of the user on the database associated with the API client, wherein the API client in the cloud-based contact center is integrated with one or more third-party assistive software or hardware, and wherein each of the one or more third-party assistive software or hardware is associated with a role-ID and operated according to the stored permissions list, and to use a preconfigured mapping of disabilities and permissions to load a component to support specially-abled needs of the user when the computerized device of the user is interacting with the web app that is running on a portal server, according to the stored permissions list.

* * * * *